Nov. 24, 1959
P. R. HOOPES
2,913,979
DUPLICATING MACHINE
Filed Oct. 22, 1956
5 Sheets-Sheet 1
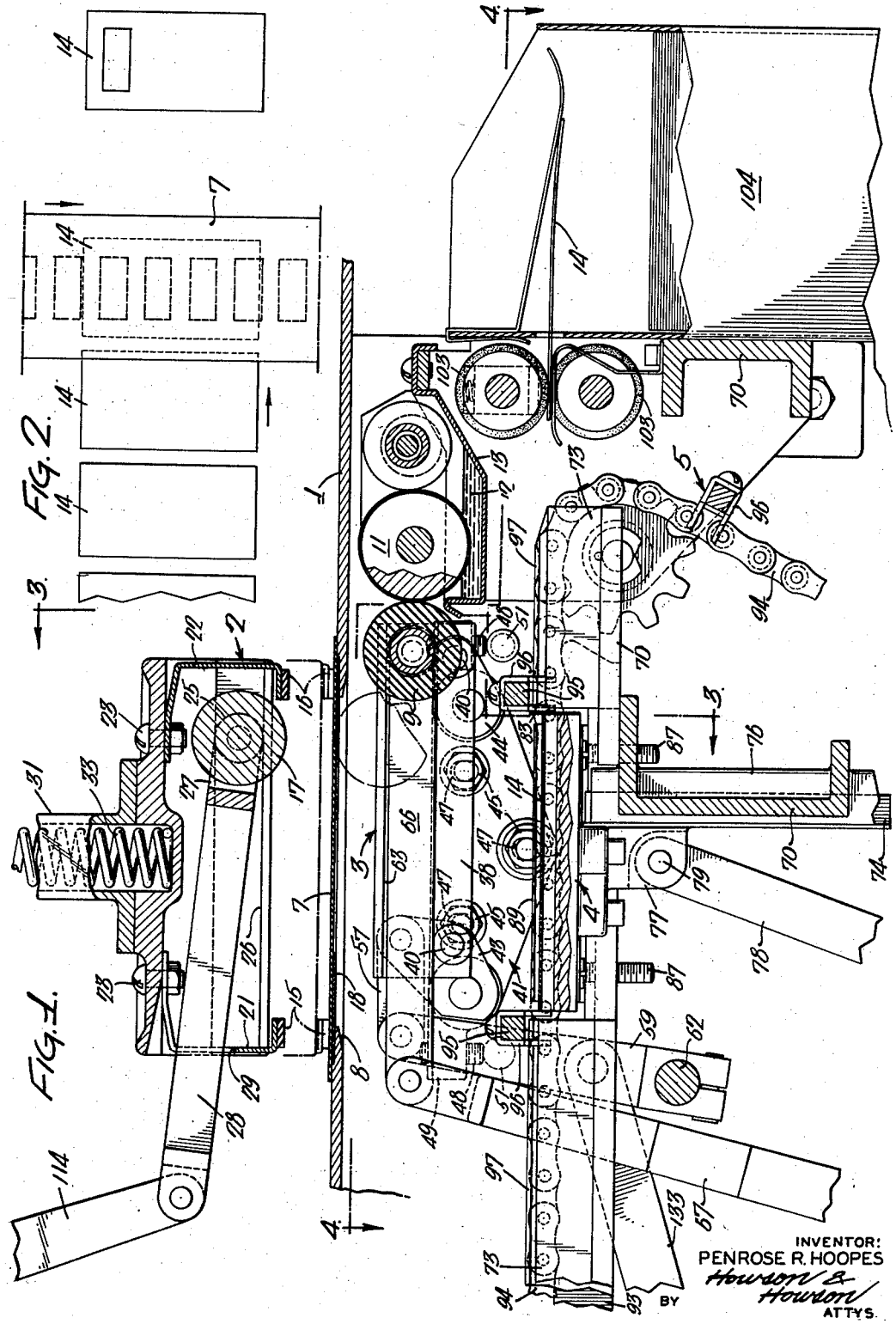
INVENTOR:
PENROSE R. HOOPES
BY Howson & Howson
ATTYS.

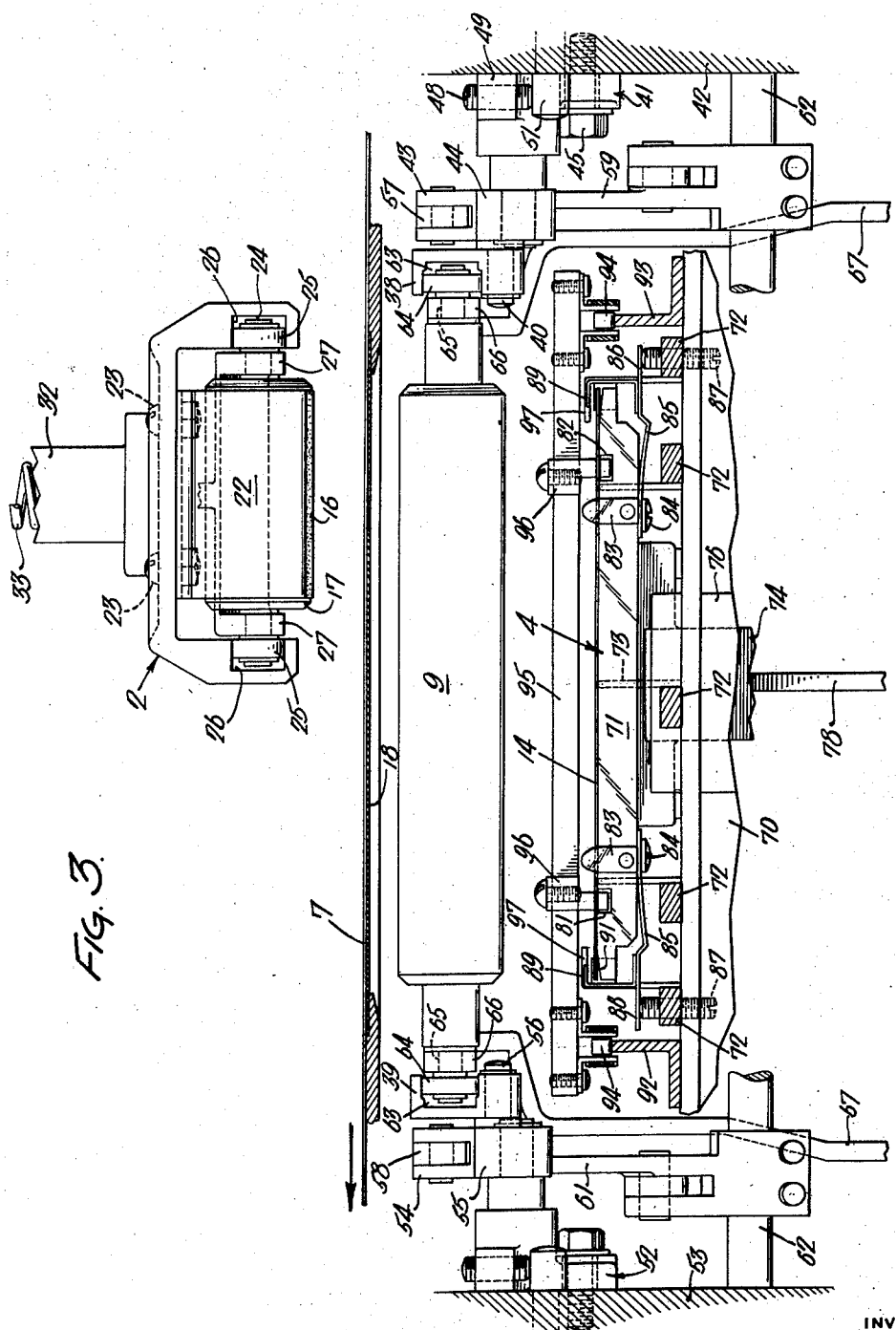

Nov. 24, 1959
P. R. HOOPES
2,913,979
DUPLICATING MACHINE
Filed Oct. 22, 1956
5 Sheets-Sheet 3
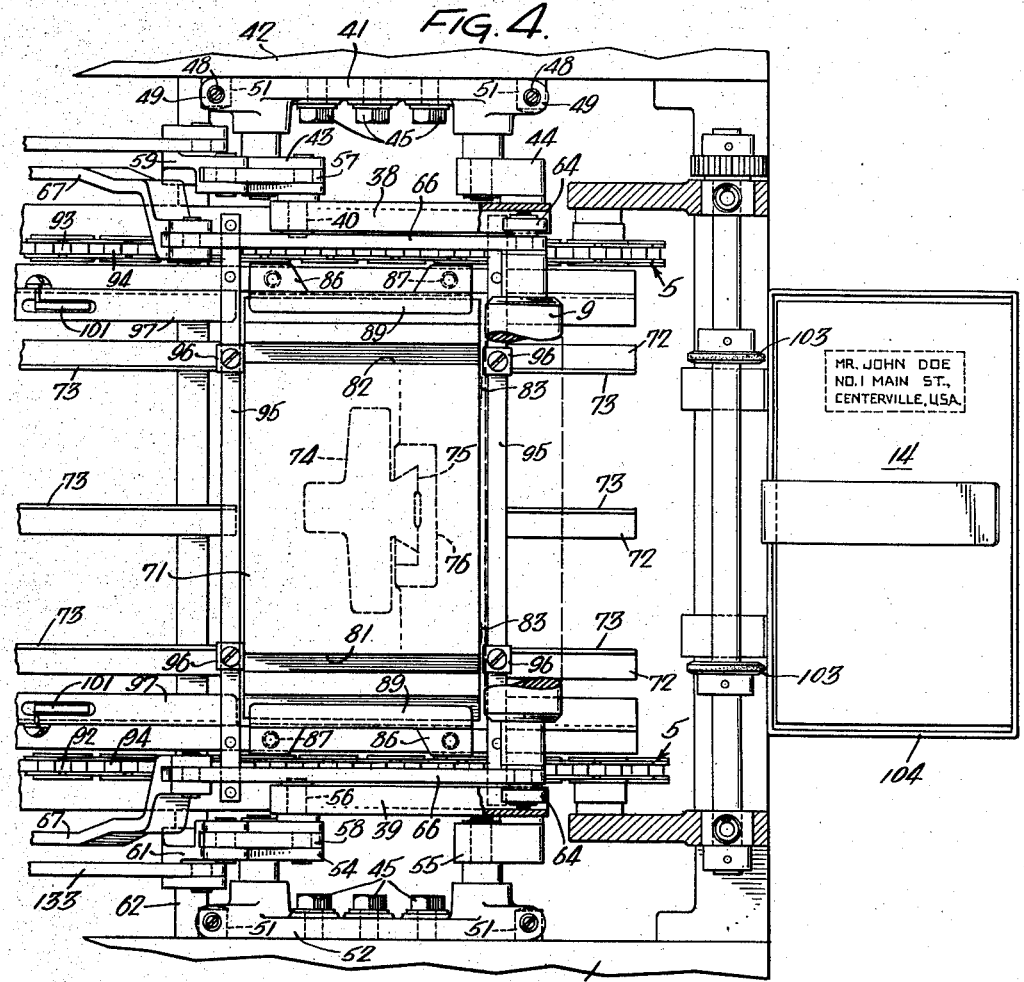
FIG. 4.
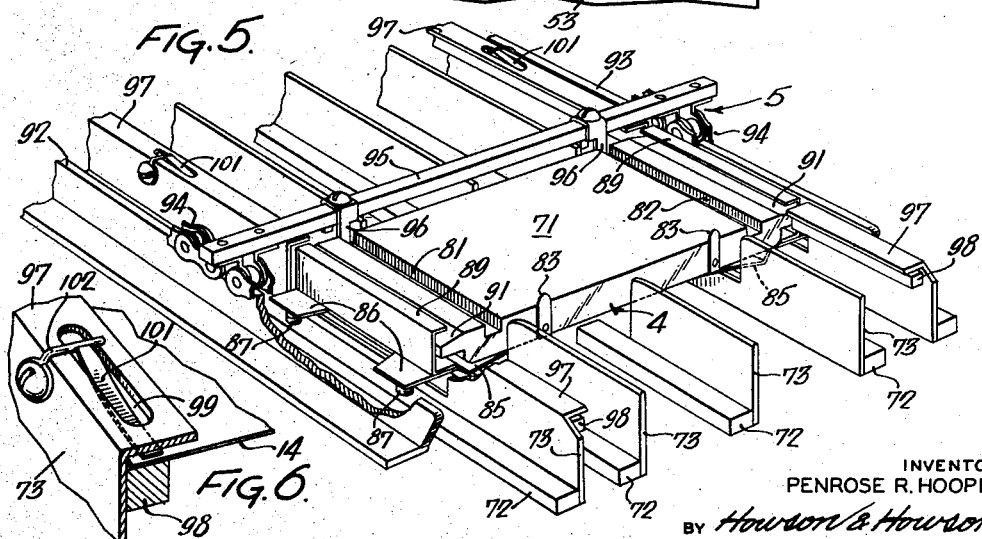
FIG. 5.
FIG. 6.
INVENTOR:
PENROSE R. HOOPES
BY Howson & Howson
ATTYS.

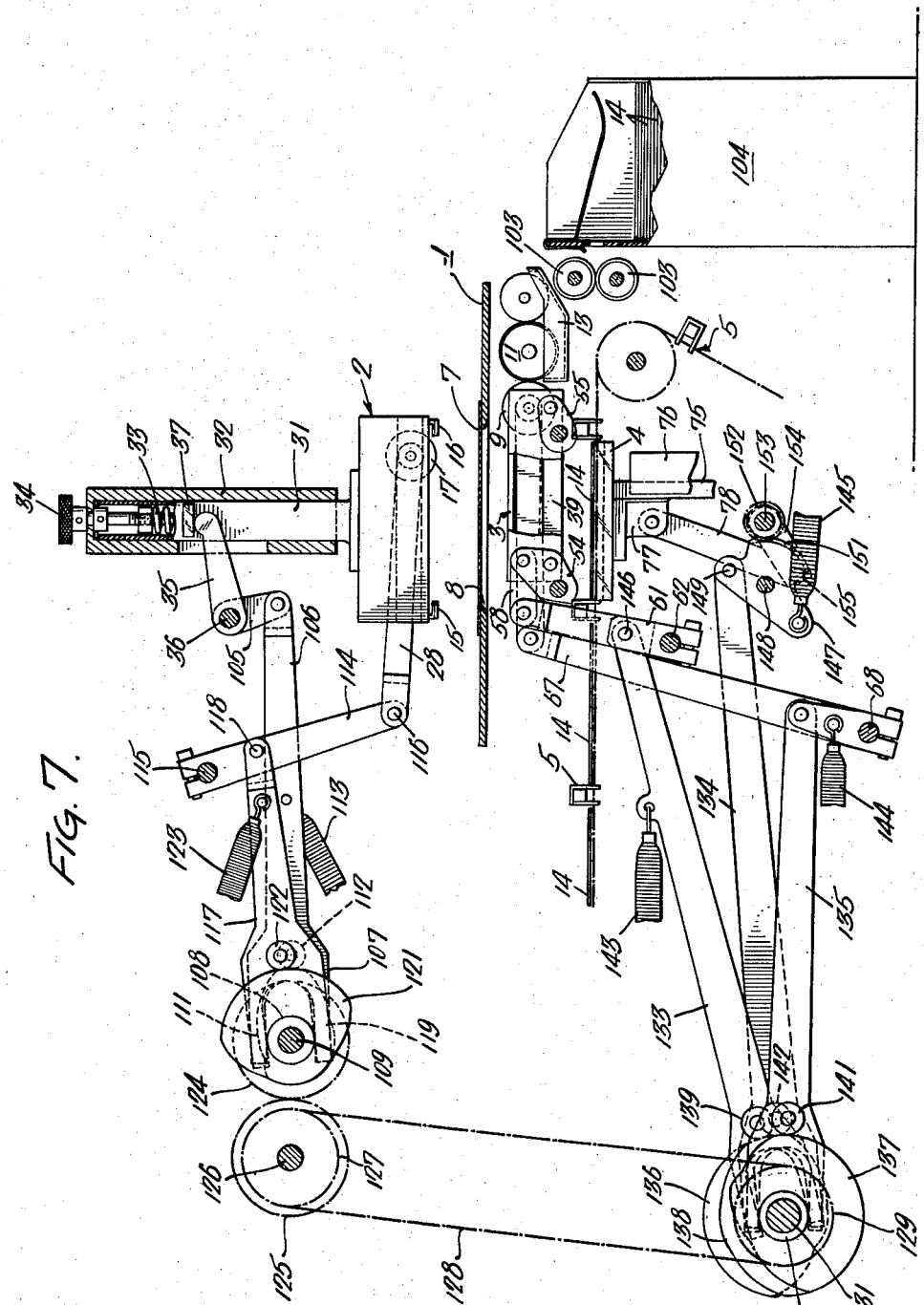
FIG. 7.
INVENTOR:
PENROSE R. HOOPES
ATTYS.

Nov. 24, 1959  P. R. HOOPES  2,913,979
DUPLICATING MACHINE
Filed Oct. 22, 1956  5 Sheets-Sheet 5
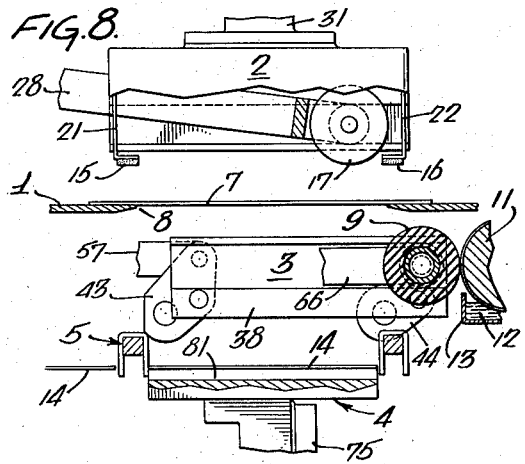
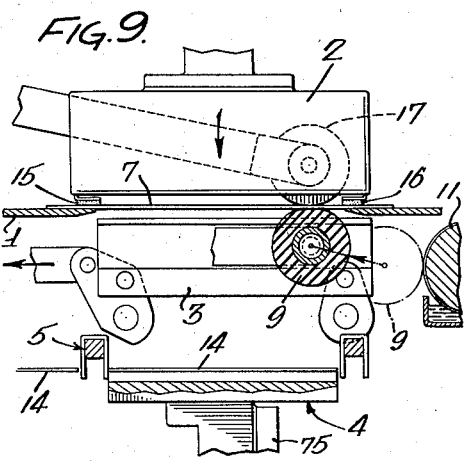
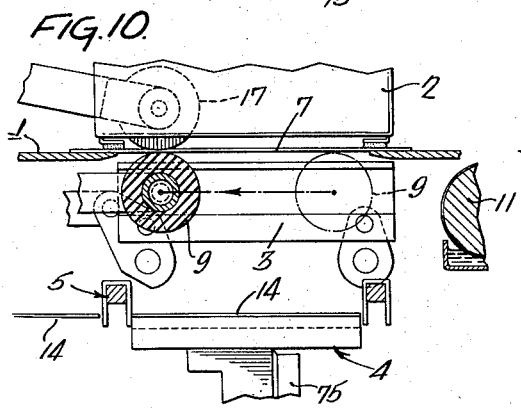
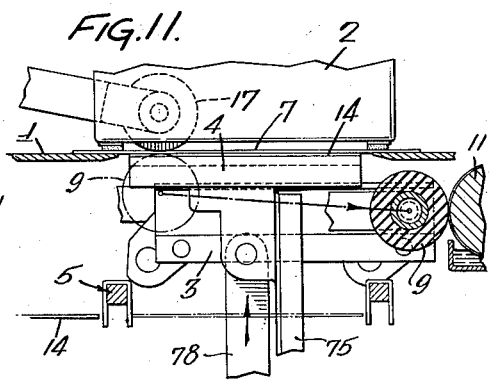
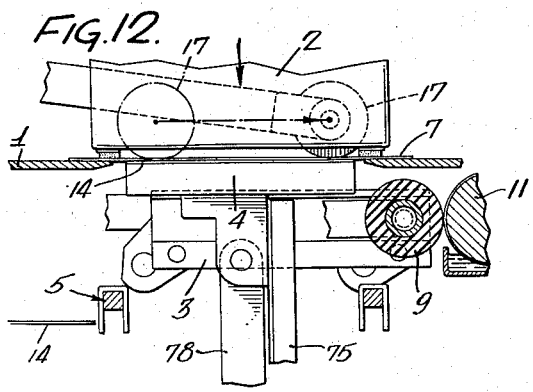
INVENTOR:
PENROSE R. HOOPES
BY Howson & Howson
ATTYS.

United States Patent Office 2,913,979
Patented Nov. 24, 1959

2,913,979

DUPLICATING MACHINE

Penrose R. Hoopes, Philadelphia, Pa., assignor to Scriptomatic, Inc., Philadelphia, Pa., a corporation of Pennsylvania Application October 22, 1956, Serial No. 617,606

13 Claims. (Cl. 101—134.5)

This invention relates to hectographic duplicating machines and a principal object of the invention is to provide a mechanically relatively simple machine capable of efficient operation at relatively high speeds and for a variety of purposes.

To these primary ends, the invention contemplates the provision in a machine of the stated type of a basic printing or transfer head of novel form and functional characteristics, said head comprising means for applying solvent to the copy stock and then making the transfer from the master card to stock in one and the same transfer station.

The invention resides further in certain mechanical and structural details hereinafter described including the means for maintaining positive control of the positions of the copy stock and the master cards during the transfer operation.

The machine will be more readily understood by reference to the attached drawings, wherein:

Fig. 1 is a vertical longitudinal sectional view illustrating the essential elements of the transfer head together with the immediately associated elements of mechanism;

Fig. 2 is a diagrammatic view illustrating the relation of the master card feed means and copy stock in the form of an endless tape;

Fig. 3 is a sectional view on the line 3—3, Fig. 1;

Fig. 4 is a horizontal sectional view on the line 4—4, Fig. 1;

Fig. 5 is a fragmentary view in perspective of the bed or frame portion of the transfer head;

Fig. 6 is a sectional perspective view on an enlarged scale showing a detail of mechanism illustrated in Fig. 5;

Fig. 7 is a diagrammatic vertical sectional view showing the synchronized actuating mechanism for the solvent-applying and impression elements of the transfer head, and Figs. 8 to 12 inclusive are diagrammatic fragmentary sectional views illustrating a full cycle of operations of the solvent-applying and impression elements of the head.

The essential elements of the transfer head illustrated in the drawings as an embodiment of the invention consists of a work table 1 for the copy stock; a vertically reciprocatory stock-retaining and -backing assembly 2; a solvent applicator assembly 3; a vertically reciprocatory platen 4 for the master cards; a conveyor 5 for conducting the master cards in succession to the platen; and a synchronized transmission mechanism for cyclic actuation of the foregoing primary elements.

The relative movement of these elements in a typical cycle of operation is illustrated in Fig. 7 to 12 inclusive. Fig. 7 shows the elements in their mutually retracted positions and conditioned for the operational cycle. The elements are illustrated diagrammatically in the same relative positions in Fig. 8. The assembly 2 is in the extreme elevated position; the copy stock 7 occupies a position on the table 1 immediately below the assembly 2 and over an opening 8 in the table; and the solvent applicator assembly 3 is in depressed position wherein applicator roll 9, constituting an element of the assembly, is in surface contact with solvent pick-up roll 11 immersed in a solvent medium 12 in a suitable container 13. The pickup roll 11 is rotated at suitable speed to apply a surface coating of the solvent solution to the applicator roll 9. The platen 4 is also in depressed position and carries a master card 14 which has been fed to the platen by the intermittent conveyor 5.

In the initial step of the cycle, the pressure head 2 is lowered to the position shown in Fig. 9 wherein resilient pressure feet 15 and 16 at opposite sides of the copy stock 7 clamp the latter firmly to the table on opposite sides of the opening 8. Simultaneously, the applicator assembly 3 is elevated to bring the applicator roll 9 into contact with the undersurface of the copy stock 7; and it will be noted that as the roll 9 engages the underside of the sheet, the upper surface of the sheet is engaged by a roller 17 housed in the assembly 2, the line of contact of the roller 17 with the stock 7 coinciding with the line on the undersurface in which the stock is engaged by the applicator roll 9.

In the next step, the applicator roll 9 and the pressure roll 17 in the same relative positions are traversed simultaneously to the left in horizontal planes and in mutual contact with the opposite surfaces of the stock 7. It may be noted by reference to Fig. 1 that the work table 1 has provision for supporting over the opening 8 a masking plate 18, see Fig. 1, which directly underlies the stock 7 and which is apertured so as to confine the application of the solvent medium by roller 9 to a selected limited area or areas of the stock. This masking plate 18 has not been shown in Figs. 8 to 12 inclusive for purposes of simplification.

Following the traverse movement to the left, the applicator roll 9 is traversed to the right and simultaneously the applicator assembly as a whole is shifted downwardly and to the right into its original position shown in Fig. 8 with the roll 9 again in contact with roll 11; and it will be noted that by reason of the downward increment of this movement of the assembly, the applicator roll 9 is immediately withdrawn from contact with the undersurface of the stock 7 so that there is no contact between the roller and the stock during the reverse traverse movement of the roll. During this movement of the applicator assembly and its roll 9, the backing roll 17 remains in the position to which it was carried in the original traverse movement, as illustrated in Figs. 10 and 11.

The next step in the operation involves the elevation of the platen 4 carrying the master card 14 which has been deposited thereon by the conveyor 5. The platen moves upwardly to a point where the surface of the card is held lightly against the underface of the stock 7, and means is provided for retaining the platen rigidly in this position wherein it constitutes a stable support for both card 14 and stock 7 capable of resisting downward pressure imposed upon it by action of the roll 17. This roll now moves to the right as viewed in Fig. 11, and thereby progressively presses the stock against the surface of the card to effect the desired printed transfer. This traverse movement of the roll 17 to the right is illustrated in Fig. 12. Prior to this movement of the roll, the assembly 2 is moved slightly closer to the plane of the table, so that the pressure of the roll against the copy stock in the subsequent pass will be greater than in its original pass. The several elements then return to the positions in which they are shown in Fig. 8 which completes the cycle of operations. Subsequently the cycle will be repeated after a movement of the conveyor 5 removing the card 14 from the platen and substituting a succeeding card 18.

The structural details of the primary elements mentioned above are illustrated in the other figures of the drawing. The assembly 2 is an inverted box-like structure best illustrated in Figs. 1 and 3. The clamping feet 15 and 16 take the form of leaf springs shaped as illustrated in Fig. 1 and designated respectively by the reference numerals 21 and 22. They are secured to the opposite ends of the head by means of bolts 23 and in effect form the end walls of the structure. The roll 17 is carried by a shaft 24, the opposite ends of which are supported on rollers 25 which travel in recessed guideways 26 in the opposite side walls of the structure, this guideway extending horizontally as shown in Fig. 1. Between the rollers 25 and the respective proximate ends of the roller 17, the shaft 24 passes through the bifurcations 27, 27 of a lever 28 which, as illustrated in Fig. 1, extends laterally through a slot 29 in the resilient foot element 21. It is by way of this lever 28 that the roller 17 receives its traverse movements. At its upper end, the structure comprises a hollow stem 31 which is guided in a cylinder 32 in the fixed frame of the machine for vertical reciprocatory movement. A spring 33 in the upper end of the cylinder 32 exerts pressure tending to force the stem 31 and the head as a whole downwardly into clamping engagement with the copy stock 7 on the table 1 as previously described. Pressure of the spring may be regulated by an adjusting screw 34 in the upper end of the cylinder. The assembly 2 is elevated against the pressure of the spring 33 by a lever arm 35 which extends from a rock shaft 36 into engagement with the underside of a lug 37 projecting from the side of the stem 31, as shown in Fig. 7. The shaft 36 is rocked by means hereinafter described to afford the vertical reciprocatory movement of the head previously described.

The applicator assembly 3 comprises two independently supported side members 38 and 39 respectively. The member 38, see Fig. 4, is supported by a bracket 41 secured to the proximate fixed side frame 42 of the machine and by way of a pair of levers 43 and 44 pivotally attached to the bracket and pivotally connected at their outer ends as indicated at 40 to the opposite ends respectively of the member 38. The bracket 41 is secured to the frame 42 by screws 45 and as shown in Fig. 1, these bolts 45 pass through slotted openings 47 in the bracket so as to afford a certain adjustability of the bracket and of the member 38 supported on the bracket. Such adjustment of the bracket 41 may be effected by means of adjusting screws 48, 48 which are threaded into lugs 49, 49 at the respective ends of the bracket and engage transverse pins 51, 51 projecting from the side frame 42. The side member 39 is similarly supported from a bracket 52 at the opposite side of the machine adjustably attached in like manner to the side frame 53 of the machine. The levers supporting the member 39 are indicated by the reference numerals 54 and 55 respectively in Fig. 4; and the pivotal connection between the member 39 and the levers 54 and 55 is indicated at 56.

As shown in Figs. 3 and 4, the upper end of each of the levers 43 and 54 is bifurcated and between the bifurcations is pivotally connected one end of a link, 57 and 58 respectively, the other ends of which are connected to arms 59 and 61 respectively which are secured to a rock shaft 62 journalled in the side frames 42 and 53 of the machine. It will be apparent that oscillation of the arms 43, 44, 54 and 55 by means hereinafter described will cause the side members 38 and 39 to move in parallel relation in oscillatory paths terminating at one end in the depressed position of the said members, see Fig. 8, and the elevated position of these members shown in Figs. 9 and 10.

Each of the members 38 and 39 has a recessed track or guideway 63 in its inner face, i.e. the mutually confronting faces, which receive rollers 64 on the opposite ends respectively of a shaft 65 which carries the applicator roll 9. The tracks 63 thus guide the roller 9 in the aforedescribed traverse movement to left and right of the applicator assembly as previously described. At points immediately adjoining the rollers 64, the shaft 65 passes through links 66, 66, one at each side of the machine, and these links connect to levers 67, 67 the lower ends of which are secured to a rock shaft 68 journalled in the main frame. Oscillations of the shaft 68 result in the aforedescribed traverse movements of the applicator roll 9.

The platen 4 is best illustrated in Fig. 1 and Figs. 3 to 6 inclusive. It consists of a plate 71, the shape of which is shown in Fig. 5. In the depressed position of the platen, as in Figs. 8 and 9 for example, the plate 71 lies in an opening in a relatively fixed bed of the machine which as shown in Fig. 5 is composed of a plurality of longitudinally extended members 72 having upstanding flanges 73. In the depressed position of the plate 71, the upper surface of the plate is flush with the upper edges of the flanges 73. In effect, the flanges 73 form elements of the conveying device on which the work cards are conducted and discharged from the plate.

As indicated in Fig. 4, the plate 71 has a depending stem 74 with a dovetailed longitudinal flange 75. This flange is guided in a dovetailed way 76 in the fixed framework of the machine or bed 70. The stem 74 has a split socket 77 which receives the upper end of a link 78, the link being pivotally connected in the socket by a pin 79. The vertical movement of the platen previously described is effected through the medium in part of the link 78. As shown in Fig. 5, the plate 71 has two transverse slots 81 and 82; and at its forward face as viewed in Fig. 5, two resilient fingers 83, 83 the upper free ends of which project slightly above the upper surface of the plate. The purposes of these elements will be hereinafter described.

Secured at opposite sides of the plate 71 and attached to the plate by means of screws 84 are a pair of leaf springs 85, 85. Each of these springs comprises a pair of laterally spaced tongues which extend beyond the edge of the plate and are arranged for cooperative engagement with set screws 87, 87 in the bed 70. The screws 87 are adjusted vertically in the bed so as to contact and displace the tongues 86 of the springs 85 upwardly when the plate 71 assumes the depressed position shown in Fig. 5. Each of the springs 85 carries a channel-shaped element which extends upwardly with its upper flange 89 projecting inwardly over the undercut side edge portion 91 of the plate 71. Fig. 3 shows the relative positions of the flange 89 and the underlying portion of the plate 71 when the latter is in the depressed position and it will be noted that in this positon the said flange is elevated above the outwardly bevelled upper surfaces of the edge portions 91 of the plate and above the side edges of the card 14 which at the moment rests upon the upper surface of the plate; the card, therefore, is free for displacement from the table. As the plate 71 moves upward in its vertical movement previously described, however, the ends of the springs 85 will leave the tops of the screws 87 and will move downwardly toward their normal unsprung positions in which the flanges 89 will be brought into clamping engagement with the side edges of the card then supported on the plate 71.

As shown in Figs. 1, 3, 4 and 5, the conveyor 5 consists of a pair of chains which ride on the upper edges of vertical flanges 92 and 93 respectively at opposite sides of the bed 70. The chains, designated by the reference numerals 94, 94 support transverse bars or flights 95 which extend across the bed 70 and which are spaced apart a distance only slightly greater than the width of the cards 14. The flights 95 have depending fingers 96, 96 which extend below the upper edges of the flanges 73 and which are aligned with the grooves 81 and 82 of the platen 4 previously described. Cards deposited on the upper edges of the flanges 73 will be advanced by movement of the chains, the fingers 96 engaging the rear edges of the cards. As best illustrated in Fig. 5, two of the upwardly extending flanges 73 of the bed 70, one at each side of the bed and aligned with the upstanding channels 88 of the springs 85, are provided at their upper edges with inturned horizontal flanges 97, and with these flanges, when the plate 71 of the platen is in the depressed position shown in Fig. 5, are in alignment with the inturned flanges 89 of the said springs. Secured to the flanges 73 immediately below the inturned flanges 97, see Fig. 6, is a longitudinal bar or equivalent element 98, the space between the overlying flanges 97 in the upper surface of the bar 98 receiving the proximate side edge of a card such as 14 as it is advanced by the conveyor on the upper edges of the flanges 73. Adjustably secured to the sides of the flanges 73 and extending through a slotted opening 99 in the transverse flange 97 is a spring presser finger 101 which by adjustment of its holder 102 may be made to exert a light downward pressure upon the edge portion of the card 14 as it advances along the rod 98.

From the rods 98 the edge portions of the card will pass onto the bevelled side edges 91 of the plate 71 and under the overlying flanges 89 of the spring elements 85. In such advance movement of the card, however, the plate will be in the depressed position shown in Fig. 5. The flight 95 of the conveyor advancing the card will have its forward movement interrupted at point short of the proximate edge of the plate 71 and approximately in the position shown in Fig. 5. The fingers 83 will arrest any free movement of the card and will locate the card accurately on the plate 71. As previously explained, as the plate starts its upward movement, the flanges 89 of the spring gripping elements 85 will move downwardly into clamping engagement with the side edges of the card to thereby anchor the cards securely in place on the platen for the subsequent transfer operation and its return again to the depressed position. As the conveyor again advances, the fingers 96 moving in the slots 81 of the plate 71 will engage the proximate edge of the card and will displace it from the plate 71, the highly flexible and resilient fingers 83 permitting movement of the card from the plate without displacing the card from its normal path with the conveyor. This discharge movement moves the forward edge of the card into the nip of feed rollers 103, see Fig. 1, which then take control to discharge the card, indicated at 14, into a stack hopper 104.

The transmission mechanism by means of which the primary elements described above move in synchronized relation is shown in Fig. 7. As there indicated, the rock shaft 36 has a depending arm 105 which is connected to one end of a lever 106. This lever has bifurcations 107 at its opposite end which embrace a collar 108 on a rotary shaft 109. This shaft also carries a cam 111 which coacts with a follower roller 112 on the lever 106. A spring 113 tends to hold the roller against the face of the cam. As the cam rotates with the shaft 109, spring 113 will move the lever 106 to the left as viewed in Fig. 7, and the cam, acting against the roller 112, will move the lever in the opposite direction against the tension of the spring. The collar 108 in conjunction with the bifurcations 107 of the lever guide the lever in this oscillatory movement. The cam 111 is shaped to first lower the assembly to an initial copy stock clamping position in which the roll 17 and the applicator roll 8 exert mutual pressure upon the stock to insure proper application of the solvent medium, and subsequently, after this initial pass of the roll 17, to move the assembly down to a terminal position increasing the pressure of the roll 17 on the stock in the impression pass.

The link 28, connected to the pressure roll 17 as previously described, is pivotally connected at its outer end to the lower end of a lever 114 which is secured to a rock shaft 115 journalled in the frame of the machine. Between the pivotal connection 116 and the rock shaft 15, a lever 117 is pivotally connected at 118 to the lever 114. This arm 117 is bifurcated at its opposite end as indicated at 119, the bifurcations receiving the collar 108 or a like collar on the shaft 109. The shaft also carries a cam 121 which coacts with a roller 122 on the side of the lever 117 and, as the shaft rotates, forces the lever 117 to the right as viewed in Fig. 7. A spring 123 tends to hold the roller 122 against the cam and draws the lever 117 to the left as the cam surface recedes from the roller. Rotation of the shaft 109 through the cam 121 will cause an oscillation of the lever 114 and consequent traverse movement of the roll 17 as previously described. Similarly, rotation of the shaft will oscillate the arm 105 and shaft 36 and also the arm 35 thereby effecting the vertical reciprocatory movement of the pressure head 2, also previously described.

The shaft 109 has a gear 124 connected thereto which meshes with a gear 125 on a rotary shaft 126. This shaft carries a sprocket 127 which is connected by a chain 128 with a sprocket 129 on a rotary shaft 131 journalled in the frame of the machine. The shaft 131 carries a collar or collars 132 which coact with the bifurcated ends of three lever arms 133, 134 and 135 in the same manner as described above in connection with the levers 106 and 107, and the shaft 131 also carries three cams 136, 137 and 138 which coact respectively with rollers 139, 141 and 142 on the levers 133, 134 and 135 respectively. Each of the levers has connected thereto a spring 143, 144 and 145 respectively, which act to maintain the cam roller against the surface of its associated cam while permitting the longitudinal displacement of the lever by cam action. The lever arm 133 is pivotally connected at 146 to the lever 61 previously described, the upper end of which is connected to link 58 of applicator assembly. Rotation of the shaft 131 will cause arms 59 and 61 to oscillate and thereby to rock the arms 43 and 54 and also the arms 44 and 55 so as to give the applicator assembly the oscillatory movement previously described which brings the applicator roller 17 into contact with the undersurface of the stock 7.

The arm 135 is connected with the lever 67 on the rock shaft 68 and through this lever and the connecting links 66 with the ends of the applicator roll 9. Oscillation of the shaft 67 from the associated cam on the shaft 138 will cause the traverse movement of the roll 17 previously described and in timed relation with the oscillatory movement of the roller guiding members 38 and 39.

The arm 134 is connected to a rock lever 147 carried by a shaft 148, the pivotal connection between the lever 134 and the rock lever 147 being indicated at 149. It will be noted that the spring 145 is attached to the lever 147 on the opposite side of the shaft 148 from the pivotal connection 149. The lever 147 carries a segmental gear 151 which meshes with a pinion 152 on a shaft 153 journalled in the frame of the machine. This shaft has secured thereto an arm 154 which is pivotally attached at its outer end to the link 78 as indicated in dotted lines at 155 in Fig. 7. Oscillation of the lever 147 will cause a rocking movement of the shaft 153 and a resultant oscillatory movement of the link 78 resulting in the vertical reciprocatory movement of the platen 4. The link 78 and the arm 154 are dimensioned so that when the platen is in the fully elevated position as illustrated in Figs. 11 and 12 the link 78 and the arm 154 will be in longitudinal alignment. These elements constitute in effect a toggle which when the platen is in the elevated position will be at dead center positively locking the platen in the elevated position against the thrust of the roll 17 in its impression movement.

The operation of this transmission mechanism to give the parts the cyclic movement previously described will now be apparent. It is to be noted particularly that the stock 7 and master cards 14 are under positive control during the cyclic movement of the parts. The initial downward movement of the assembly 2 clamps the sides of the copy stock to the table 1. The master card is also clamped in place on the platen by the initial upward displacement movement. This clamped and immobilized condition of stock and card is maintained until the transfer has been completed.

It will be apparent that the machine is highly adaptable to many different types of printing operation. The transfer of data from master cards to copy stock in the form of the tape 7 is illustrative only of the principle of operation, and the copy stock may take many different forms such, for example, as envelopes or cards fed successively by hand or by suitable mechanism well known in the art.

I claim:

1. In a duplicating machine for transferring data from master cards to copy stock, means for supporting said stock at a transfer station, means for passing a solvent-carrying roll across one face of said stock at said station, means for simultaneously passing a backing roll across the opposite face of the stock in pressure reacting relation with the solvent-carrying roll, mechanism for thereafter bringing a master card into transfer position at the solvent-moistened face of the stock, and means for again traversing the backing roll across the said opposite face of the stock to progressively press the stock against the confronting face of the card to complete the transfer.

2. In a duplicating machine for transferring data from master cards to copy stock, means for supporting said stock at a transfer station, a pair of rolls and mechanism for simultaneously traversing said rolls across the opposite faces of said stock in mutually opposed relation, means for applying a solvent medium to the surface of one of said rolls for application by the latter to the surface of the stock, mechanism for bringing a master card into data transfer position at the solvent-moistened face of the stock, and mechanism for subsequently again traversing the other of the rolls across the opposite face of said stock to press the stock progressively into transfer contact with the card.

3. A duplicating machine according to claim 1 including means for increasing the pressure of the backing roll on the stock during the transfer traverse.

4. A duplicating machine according to claim 2 including means for rigidly supporting the said card against the roll pressure.

5. In a duplicating machine for transferring data from master cards to copy stock, the combination with means for supporting said stock at a transfer station, of a reciprocating backing assembly movable to and from an operative position at one face of the stock, means on said assembly co-active with said supporting means when the assembly is in the operative position to clamp the stock in said station, an oscillatory applicator assembly movable to and from an operative position at the other face of the stock, a backing roll in the backing assembly traversable across and in contact with the face of the stock successively in two opposite directions when the assembly is in the operative position, an applicator roll in the applicator assembly traversable across and in contact with the proximate face of the stock in one of said directions when the applicator assembly is in the operative position and retractible with said assembly from the face of the stock during traverse in the opposite direction, mechanism for traversing the rolls in mutually opposed and pressure applying relation with the stock in the first of said directions, and mechanism operative after the retractive movement of the applicator roll for moving a master card against the face of the stock traversed by the applicator roll and for retaining said card in position during the traverse movement of the backing roll in the second of said directions.

6. A duplicating machine according to claim 5 wherein each of said assemblies comprises a guideway for the associated roll in which the roll is guided in a path paralleling the plane in which the copy stock is supported.

7. A duplicating machine according to claim 6 including means operative on the applicator roll in the retracted position for applying a solvent medium to the roll surface for subsequent application to the stock surface.

8. In a duplicating machine for transferring data from master cards to copy stock, means including a table for supporting said stock at a transfer station, mechanism for applying a solvent medium to a face of the stock at said station, mechanism for feeding master cards in said station into transfer position at the solvent moistened face of the stock and mechanism at the opposite face of the stock for pressing the stock into transfer contact with the confronting face of the card, said pressing mechanism including a stock-clamping head movable to and from the table, a roll mounted in the head for contact with the stock when the head is in stock-clamping position and guided for movement in the head in pressure contact with the stock, and mechanism for traversing the roll in said guide.

9. In a duplicating machine for transferring data from master cards to copy stock, the combination with means for supporting said stock at a transfer station, of a reciprocating backing assembly movable to and from an operative position at one face of the stock, means on said assembly co-active with said supporting means when the assembly is in the operative position to clamp the stock in said station, an oscillatory applicator assembly movable to and from an operative position at the other face of the stock, a backing roll in the backing assembly traversible across and in contact with the face of the stock successively in two opposite directions when the assembly is in operative position, an applicator roll in the applicator assembly traversible across and in contact with the proximate face of the stock in one of said directions when the applicator assembly is in the operative position and retractible with said assembly from the face of the stock during traverse in the opposite direction, a mechanism for traversing the rolls in mutually opposed and pressure applying relation with the stock in the first of said directions, a master card supporting platen movable to and from the surface of the supported stock traversed by the applicator roll, and mechanism for advancing the platen into operative position with respect to the stock after retraction of the applicator assembly and for retaining the master card in place during the traverse movement of the backing roll in the second of said directions, and for subsequently retracting the platen while the applicator assembly is in the said retracted position.

10. A duplicating machine according to claim 9 including mechanism for reversely traversing the backing roll across the proximate face of the copy stock while the platen is in the operative position.

11. A duplicating machine according to claim 10 including means for moving the backing assembly closer to the plane of the stock prior to the said reverse traverse of the backing roll to increase the pressure of the roll against the stock during said traverse.

12. In a duplicating machine for transferring data from master cards to copy stock, means for supporting said stock at a transfer station, mechanism for applying a solvent medium to a face of said stock at said station, a platen, means for reciprocating said platen from a card receiving position to a transfer position adjacent the solvent-moistened face of the stock, card conveyor means operable to deposit said cards individually on said platen when said platen is in said card receiving position, means operable after said platen receives said card to actuate said platen to said transfer position, and mechanism at the opposite face of the stock for pressing the stock into transfer contact with the confronting face of the card when said card and platen are in said transfer position.

13. In a duplicating machine for transferring data from master cards to copy stock, means for supporting said stock at a transfer station, mechanism for applying a solvent medium to a face of said stock at said station, a platen, means for reciprocating said platen from a card receiving position to a transfer position adjacent the solvent-moistened face of the stock, card conveyor means operable to deposit said cards individually on said platen when said platen is in said card receiving position, indexing means carried by said platen operable to be actuated to a position in engagement with the card deposited on said platen upon movement of said platen to said transfer position to maintain said card in a predetermined position on said platen upon movement of said platen to said transfer position, and mechanism at the opposite face of the stock for pressing the stock into transfer contact with the confronting face of the card when said card and platen are in said transfer position.

References Cited in the file of this patent

UNITED STATES PATENTS

| | | |
|---|---|---|
| 513,212 | Stackhouse | Jan. 23, 1894 |
| 538,403 | Belknap | Apr. 30, 1895 |
| 1,255,032 | McMillan | Jan. 29, 1918 |
| 1,612,717 | Gillette | Dec. 28, 1926 |
| 1,921,511 | Elliott | Aug. 8, 1933 |
| 1,967,873 | Duncan | July 24, 1934 |
| 2,013,089 | Elliott | Sept. 3, 1935 |
| 2,054,344 | Storck | Sept. 15, 1936 |
| 2,076,023 | Halsted | Apr. 6, 1937 |
| 2,088,469 | Elliott | July 27, 1937 |
| 2,344,345 | Elliott | Mar. 14, 1944 |
| 2,356,951 | Runton | Aug. 29, 1944 |
| 2,615,390 | Sauerman | Oct. 28, 1952 |
| 2,708,404 | Wright | May 17, 1955 |
| 2,744,347 | Verzera | May 8, 1956 |
| 2,766,685 | Sauerman | Oct. 16, 1956 |